US006792171B2

(12) United States Patent
Hargis et al.

(10) Patent No.: US 6,792,171 B2
(45) Date of Patent: Sep. 14, 2004

(54) RECEIVER OPTICAL SUB-ASSEMBLY

(75) Inventors: Marian C. Hargis, Rochester, MN (US); David Peter Gaio, Rochester, MN (US); Christopher M. Gabel, Rochester, MN (US); Sundeep NandNangalia, Raleigh, NC (US); James Walling, West Melbourne, FL (US); Philip Deane, Satellite Beach, FL (US); William K Hogan, Rochester, MN (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/713,377

(22) Filed: Nov. 14, 2003

(65) Prior Publication Data

US 2004/0105627 A1 Jun. 3, 2004

Related U.S. Application Data

(60) Provisional application No. 60/426,936, filed on Nov. 15, 2002.

(51) Int. Cl.⁷ ................................................ G02B 6/12
(52) U.S. Cl. ............................. 385/14; 385/92; 385/94; 385/88
(58) Field of Search ............................. 385/14, 88, 92, 385/94

(56) References Cited

U.S. PATENT DOCUMENTS

| 5,161,044 | A | * | 11/1992 | Nazarathy et al. | ........... 398/194 |
| 5,659,560 | A | * | 8/1997 | Ouchi et al. | ................... 327/27 |
| 6,160,647 | A | * | 12/2000 | Gilliland et al. | .............. 398/23 |
| 6,526,075 | B2 | * | 2/2003 | Mizutani | ..................... 372/27 |
| 6,657,272 | B2 | * | 12/2003 | He et al. | .................... 257/466 |

* cited by examiner

Primary Examiner—Brian M. Healy
(74) Attorney, Agent, or Firm—Allen, Dyer, Doppelt, Milbrath & Gilchrist, P.A.

(57) ABSTRACT

The invention relates to a receiver optical sub-assembly (ROSA) for use in a high-speed small-form factor transceiver. The ROSA, according to the present invention, includes a stacked chip design in which a semiconductor micro-bench, upon which the photodiode and transimpedance amplifier are mounted, is disposed perpendicular to the direction that the light travels. A flexible electrical connector is attached to the semiconductor micro-bench for electrically connecting the ROSA to a host a transceiver device. The flexible electrical connector is fixed to the surface of the semiconductor micro-bench with portions cut-out to receive the amplifier and other electrical components extending therefrom. To facilitate assembly, wells are etched from the semiconductor micro-bench corresponding to bumps extending from a mounting flange for the optical coupler.

21 Claims, 13 Drawing Sheets

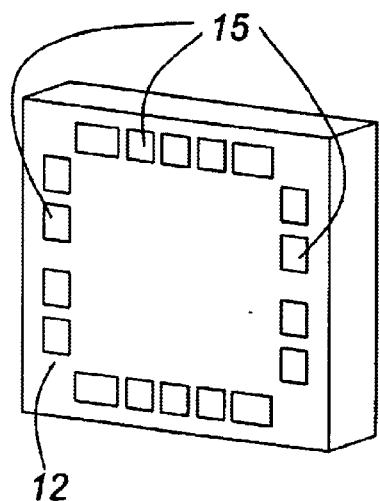
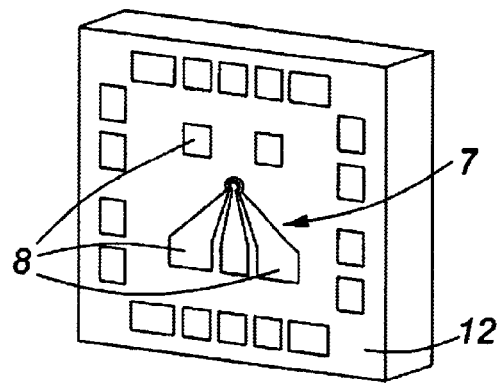
FIG. 2A          FIG. 2B
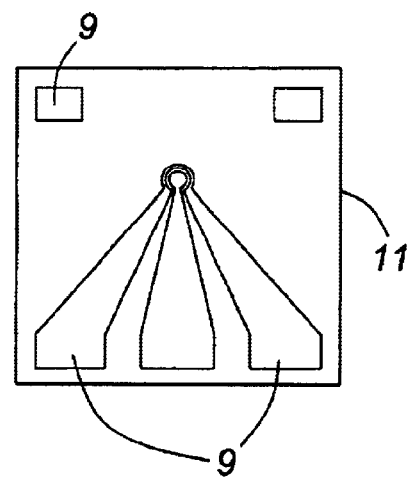
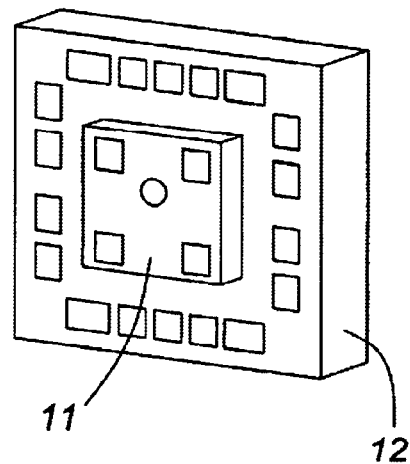
FIG. 2C          FIG. 2D

RECEIVER OPTICAL SUB-ASSEMBLY

CROSS-REFERENCE TO RELATED APPLICATIONS

The present invention claims priority from U.S. patent application Ser. No. 60/426,936 filed Nov. 15, 2002, which is incorporated herein by reference for all purposes.

TECHNICAL FIELD

The present invention relates to a fiber optic receiver optical sub-assembly (ROSA), and in particular to a high-speed, small form factor ROSA requiring minimal assembly and alignment steps.

BACKGROUND OF THE INVENTION

Small form factor transceivers are adapted to receive LC optical connectors with a transmitter (Tx) to receiver (Rx) port pitch of 6.25 mm, which is half the standard port pitch distance, 12.5 mm, found in SC transceivers. Conventional small form factor transceivers use Transistor-Outline (TO) can technology for packaging their ROSAs; however, recent demand for small form factor transceivers operating at high bit rates (>10 Gb/s) have necessitated modifications to the conventional TO can arrangement. Standard photodiodes are packaged along with a pre-amplifier in a TO can package, which is a hermetically sealed unit with a lens in one end for directing incoming light onto the photodiode for conversion of the light into an electrical current. The conventional TO can package implementation of an optical receiver includes four leads, two of which provide transmission of power (Power and Ground) and two of which provide transmission of differential data (Out+ and Out−). Newly developed electro-optic devices, e.g. transceivers, offer diagnostic capabilities, such as optical power monitoring, which includes measuring the power level of the input optical signal. Monitoring the power level of incoming light provides an indication of the quality of the transmitting laser, as well as the incoming transmission line. Accordingly, for newer high-speed ROSAs, the number of leads must be increased to at least six, and the lengths of the leads extending from therefrom must be minimized. Furthermore, the signal path for the electronics must be simplified, and flexible enough, in manufacture, to support both high and lower data rates. Moreover, to minimize costs, the total number of parts must be minimized, and the optical alignment process must be simplified.

An object of the present invention is to overcome the shortcomings of the prior art by providing a relatively simple high-speed small form factor ROSA with the photodiode mounted on the pre-amplifier, which is connected directly to an electrical connector for transmitting electrical signals between the ROSA and the host transceiver.

SUMMARY OF THE INVENTION

Accordingly, the present invention relates to a receiver optical sub-assembly (ROSA) for mounting in a host opto-electronic device comprising:

an optical coupler for receiving an optical signal from an optical waveguide along an optical axis;

photodiode disposed along the optical axis for receiving the optical signal and for converting the optical signal into an electrical current signal;

an amplifier for converting the electrical current signal into a differential voltage signal, having the photodiode mounted thereon;

a substrate, a first surface of which is connected to the optical coupler, and a second surface of which supports the amplifier, whereby the optical signal travels from the first surface through the substrate to the photodiode mounted on the amplifier;

an electrical connector connected to the second surface for electrically connecting the photodiode and the amplifier to the host opto-electronic device.

BRIEF DESCRIPTION OF THE DRAWINGS

The invention will be described in greater detail with reference to the accompanying drawings which represent preferred embodiments thereof, wherein:

FIG. 2a is an isometric view of the trans-impedance amplifier of the ROSA of FIG. 1;

FIG. 2b is an isometric view of the trans-impedance amplifier of the ROSA of FIG. 1 with a redistribution layer thereon;

FIG. 2c is an plan view of the photodiode of the ROSA of FIG. 1;

FIG. 2d is an isometric view of the photodiode/trans-impedance amplifier assembly of the ROSA of FIG. 1;

DETAILED DESCRIPTION

Figure 1:
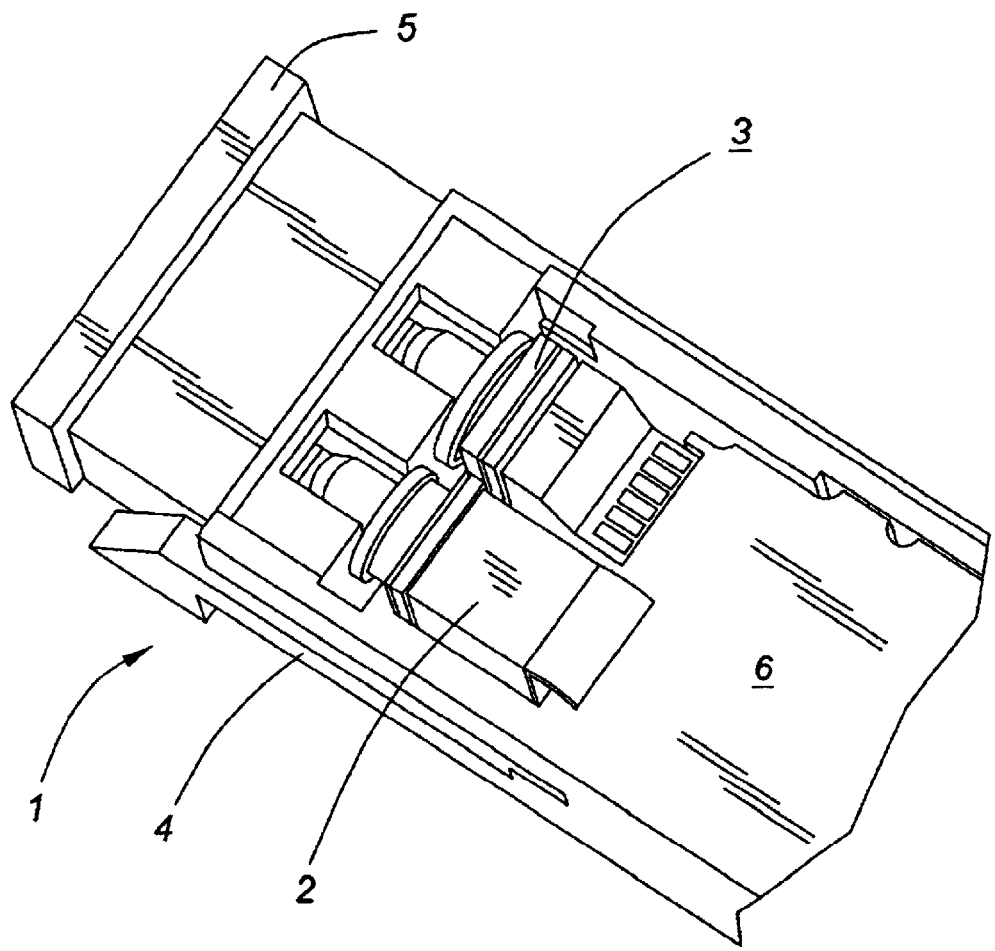
FIG. 1 is a isometric view of an optical transceiver including a ROSA according to the present invention.

With reference to FIG. 1, an opto-electronic device, in the form of an optical transceiver 1, includes a transmitter optical sub-assembly (TOSA) 2 and a stacked chip receiver optical sub-assembly (ROSA) 3 mounted adjacent one another in a transceiver module 4. A duplex optical connector 5 is formed in the front end of the transceiver module 4 for receiving the ends of optical fibers (not shown), which optically couple the TOSA 2 and the ROSA 3 to an optical network. A circuit board 6 is electrically connected to the TOSA 2 and the ROSA 3 inside the transceiver module 4, and includes circuitry for controlling the TOSA 2 and the ROSA 3. An electrical connector (not shown) is electrically connected to the circuit board 6 for transmitting electrical signals between the circuit board 6 and a host device (not shown).

Figure 3:
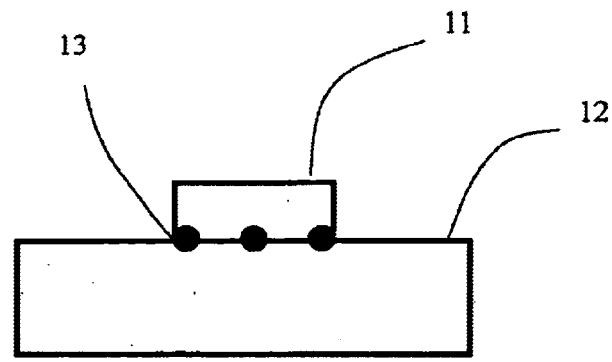
FIG. 3 is a side view of a photodiode/trans-impedance amplifier assembly of the ROSA of FIG. 1.
Figure 4:
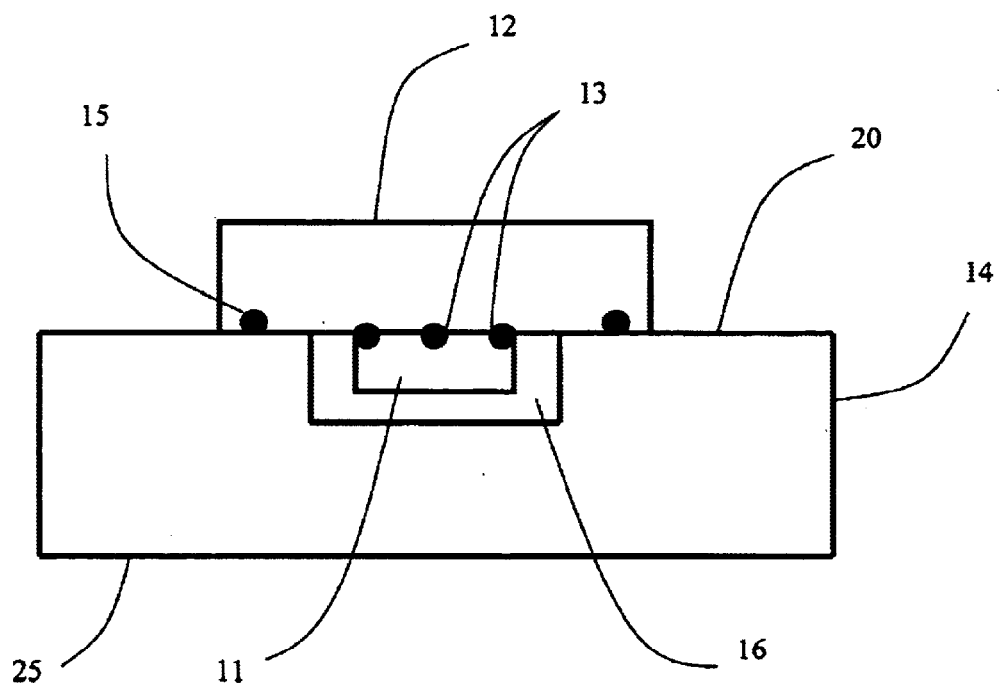
FIG. 4 is a side view of the photodiode/trans-impedance amplifier assembly of FIG. 3 mounted on a semiconductor micro-optical bench.
Figure 5:
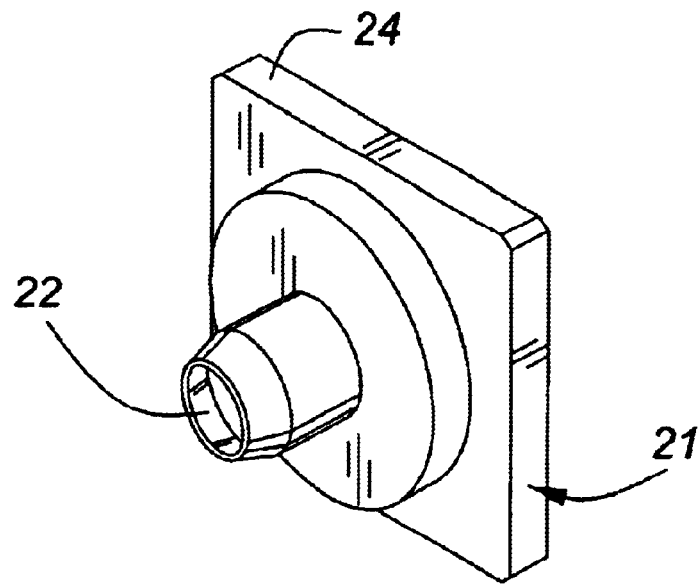
FIG. 5 is an isometric view of an optical coupler according to the present invention.
Figure 6:
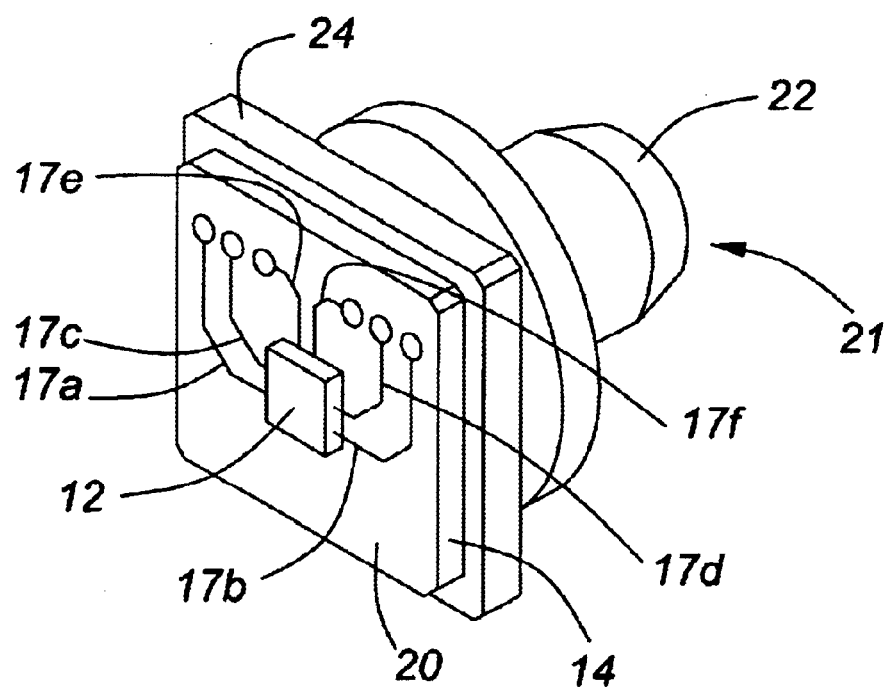
FIG. 6 is an isometric view of the assembly of FIG. 4 mounted on the optical coupler of FIG. 5.

The illustrated photodiode 11 (FIGS. 2 to 4) is a rear-illuminated reverse-biased photodiode, which responds to an incident optical signal by generating a current with both an AC and a DC component. Electrical contacts 8 on a mounting surface of the pre-amplifier 12 are connected to corresponding electrodes 9 on the photodiode 11 using any one of many known methods, such as the use of solder bumps 13 in a flip chip bonding process. With reference to FIGS. 2a to 2d, a redistribution layer 7, with the pre-amplifier contacts 8, is preferably added to the pre-amplifier 12 after initial processing to match the electrical contacts 9 on the photodiode 11. The flip chip bonding process provides very low package parasitics, while enabling the photodiode 11 to aligned with high precision. Alternatively, a wiring layout with contacts 8 can be added to the metallurgy of the pre-amplifier 12 during initial processing; however, this method precludes the pre-amplifier 12 from being used with standard wire bonds, as well.

Front-illuminated photodiodes (not shown) could also be used, in which a contact at the photodiode substrate connects to a pad on the pre-amplifier, and a wire bond would connect the top surface of the photodiode with the pre-amplifier pad. Newly developed front-illuminated photodiodes bring the substrate contact to the top surface of the photodiode, so that both contacts can be made with wire bonds.

Preferably, the pre-amplifier 12 is a high speed trans-impedance amplifier, which translates the AC component of the input current into a differential output signal, i.e. $V_{diff}= V_{out+}-V_{out-}$. The differential voltage amplitude is thereby proportional to the incident optical signal amplitude. Using a flip-chip assembly process, the photodiode 11 and pre-amplifier 12 are mounted on a substrate in the form of a Silicon optical bench (SiOB) 14, which has a cavity 16 formed therein for receiving the photodiode 11. Preferably, the SiOB 14 is transparent to the optical signal; however, providing a window therein or a passage therethrough are also possibilities. Solder bumps 15, disposed around the cavity 16, secure the pre-amplifier 12 to the SiOB 14. The SiOB 14 also includes six coplanar electrical trace leads 17a to 17f, two for power transmission 17a and 17b, two for differential data transmission 17c and 17d, and two for optical power monitoring 17e and 17f, as discussed above.

Figure 7A:
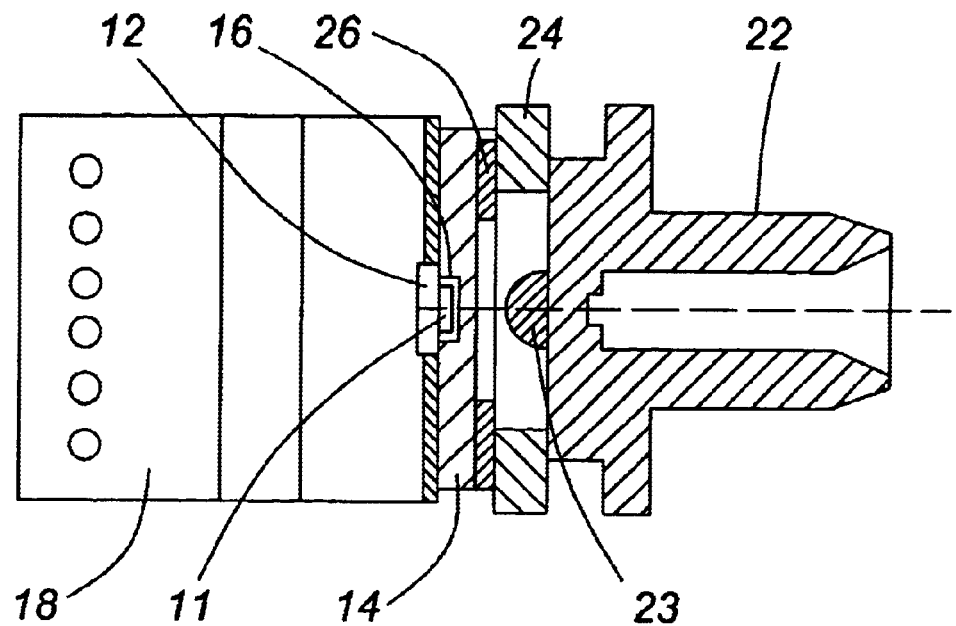
FIG. 7a is a plan view of the ROSA of FIG. 1.
Figure 7B:
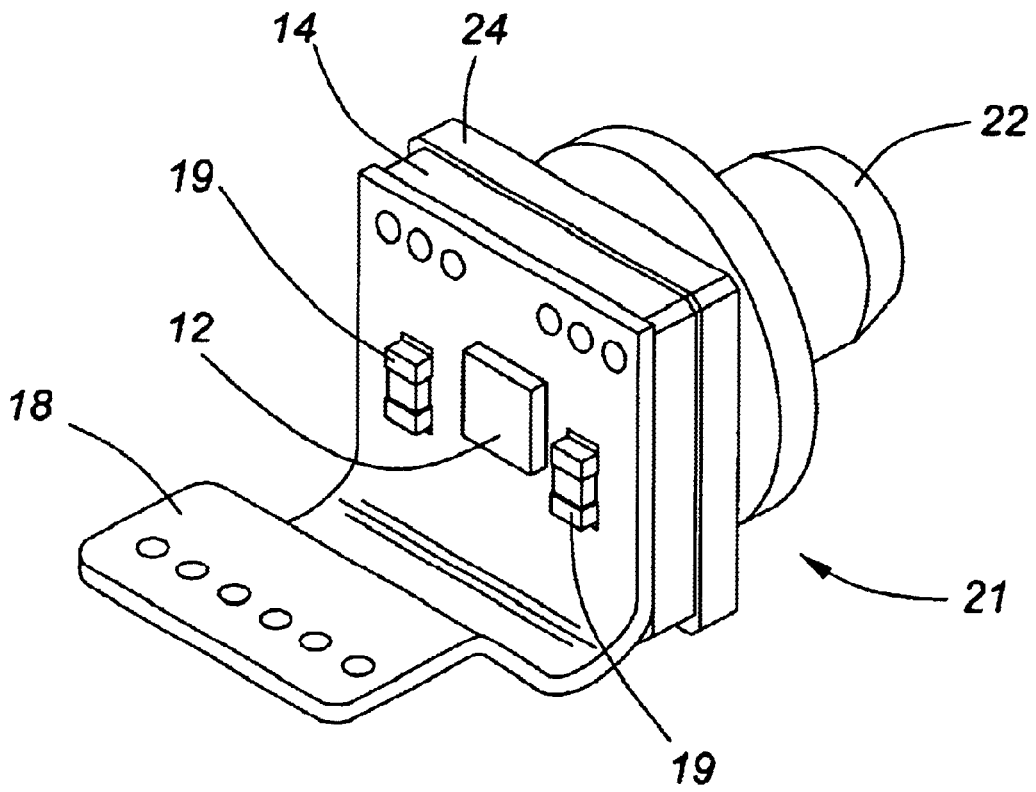
FIG. 7b is an isometric view of the ROSA of FIG. 1.

The ends of the leads 17a to 17f are electrically connected to a flexible circuit connector 18 (FIGS. 7a and 7b), which electrically connects the elements of the ROSA 3 to the circuit board 6 of the transceiver 1. Holes are cut in the flexible circuit connector 18 to enable the trans-impedance amplifier 12 and any other electrical components 19 mounted on the SiOB 14 to extend therethrough. The entire end section of the flexible circuit connector 18 completely covers the rear surface 20 of the SiOB 14, whereby the SiOB 14 acts as a stiffener plate for the flexible circuit connector 18.

Figure 8:
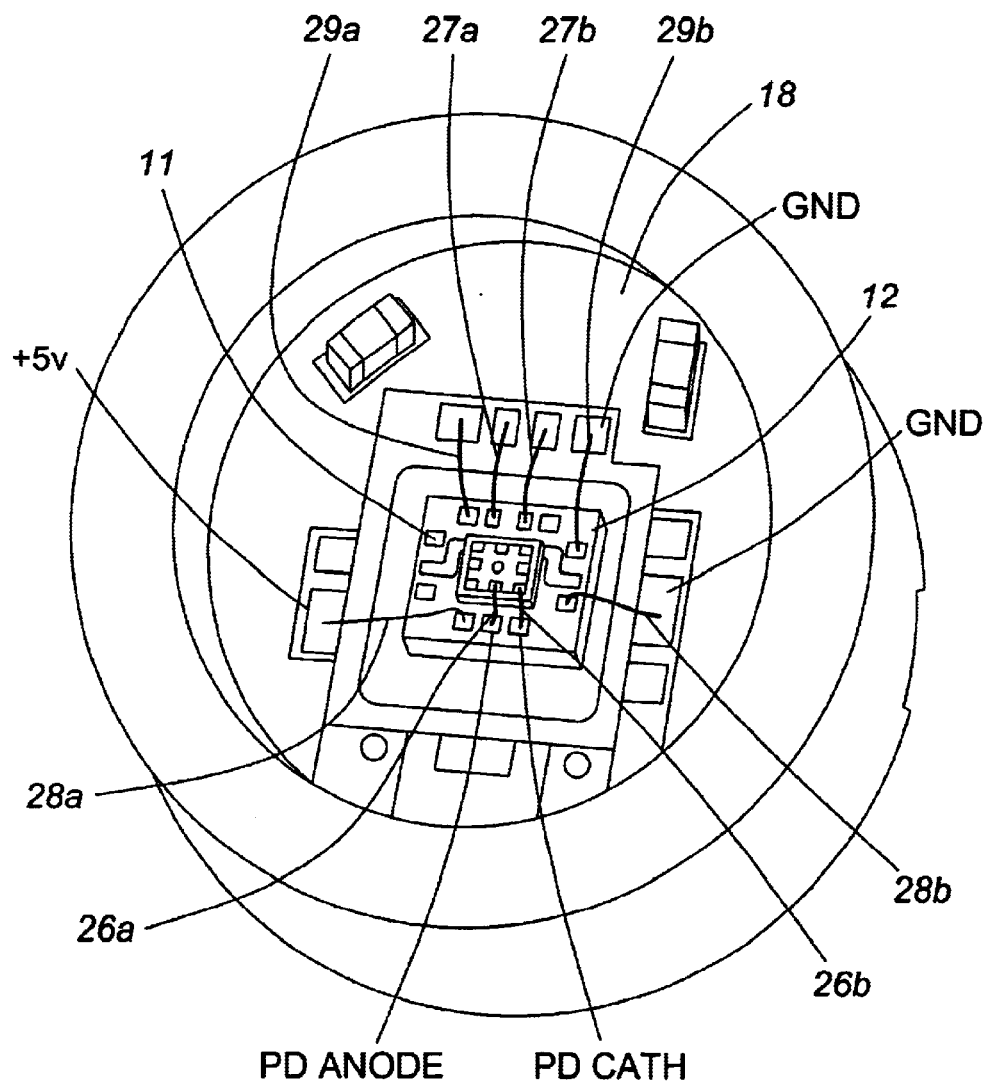
FIG. 8 is an isometric view of an alternative means for electrically connecting the photodiode, the pre-amplifier and the flexible electrical connector.

FIG. 8 illustrates a wire bonded version for electrically connecting the photodiode 11, the pre-amplifier 12 and the flexible circuit connector 18. Wire bonds 26a and 26b connect the photodiode anode and cathode, respectively, to the pre-amplifier 12. Wire bonds 27a and 27b transmit the differential data signals from the pre-amplifier 12 to the flexible circuit connector 18, while power is transmitted using wire bonds 28a and 28b. Optical power monitoring signals are sent using wire bonds 29a and 29b.

Mounted on the front surface 25, opposite the rear surface 20, of the SiOB 14 is an optical connector 21, including a ferrule-receiving tube 22 and a lens 23. To minimize the size of the ROSA 3, the front and rear surfaces 20 and 25 of the SiOB 14 are perpendicular to the optical axis OA of the lens 23, i.e. to the direction of the incident light hitting the photodiode 11, and the photodiode 11, the pre-amplifier 12, optical connector 21 and the lens 23 are all disposed along the optical axis OA. However, the front surface 20 can be angled slightly to limit back reflections. Any size of optical connector 21 can be used; however, the ROSA of the present invention is specifically designed for use with LC optical connectors. A mounting flange 24 is provided on the optical connector 21 to facilitate connection thereof with the SiOB 14. A spacer 26 can be provided to ensure the lens 23 is correctly spaced from the photodiode 11, and to provide a more effective bonding material between the flange 24 and the SiOB 14. The cavity 16 can be filled with a material with an index of refraction similar to that of the lens 23 to improve the optical return loss.

Figure 9:
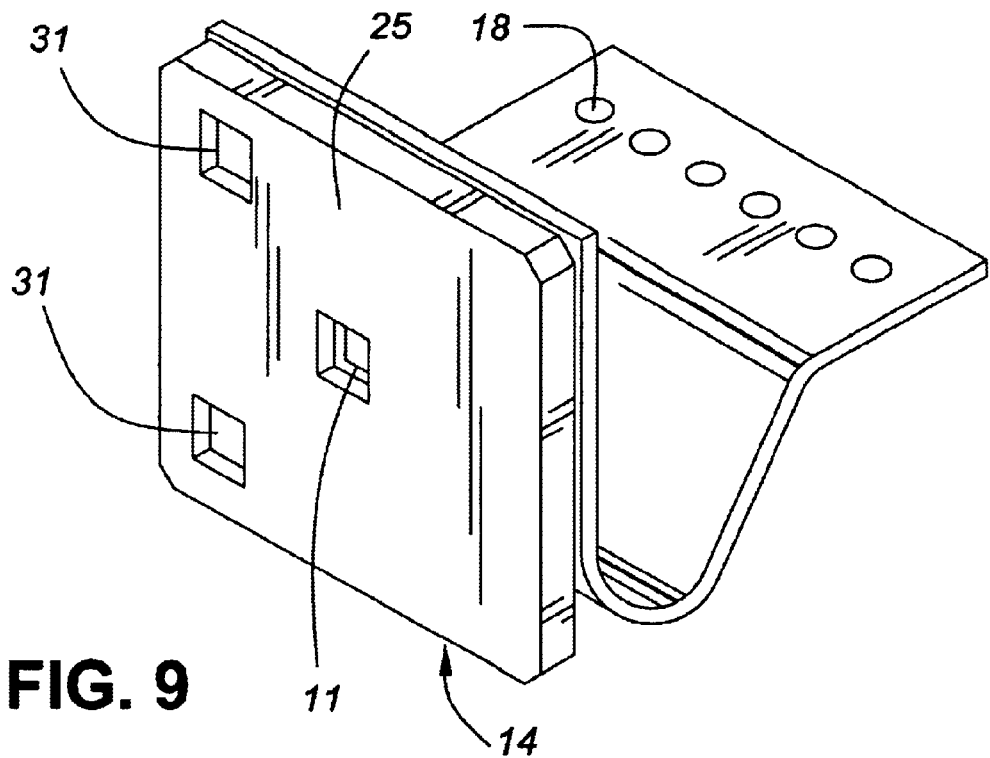
FIG. 9 is an isometric view of the semiconductor micro-optical bench of FIG. 4 illustrating alignment wells.
Figure 10:
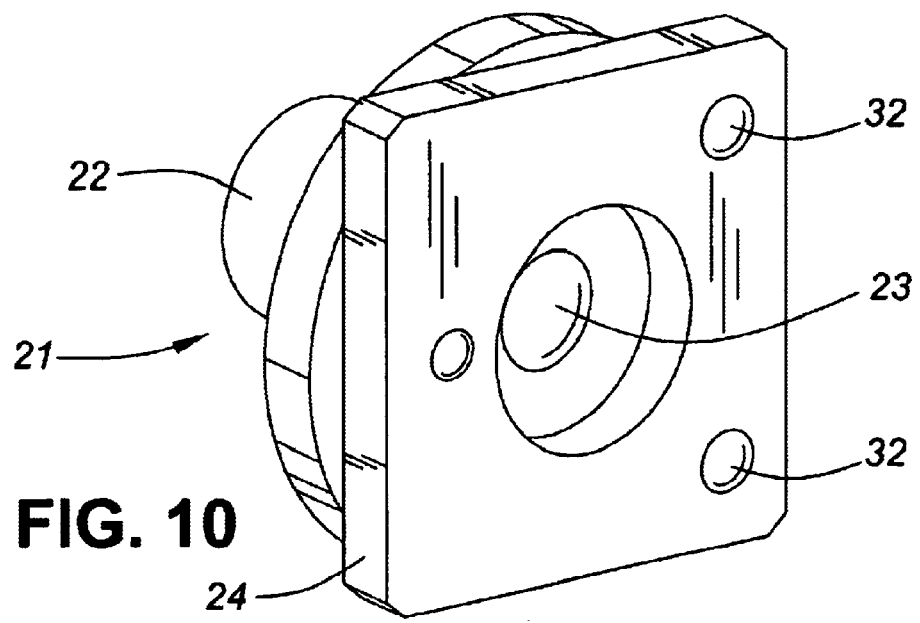
FIG. 10 is an isometric view of the optical coupler of FIGS. 6 to 9 illustrating alignment bumps.

With reference to FIGS. 9 and 10, alignment of the optical coupler 21 with the SiOB 14 can be facilitated by the provision of wells 31 formed in the front surface 25 corresponding with bumps 32 extending from the mounting flange 24. The optical coupler 21 and the SiOB 14 can then be aligned using kinematic mounting methods. Obviously, the positioning of the wells 31 in the SiOB 14 and the bumps 32 on the mounting flange 24 could be reversed. Alternatively, the optical coupler 21 could be actively aligned with SiOB 14 using conventional alignment techniques and secured together with epoxy or adhesive.

Figure 11:
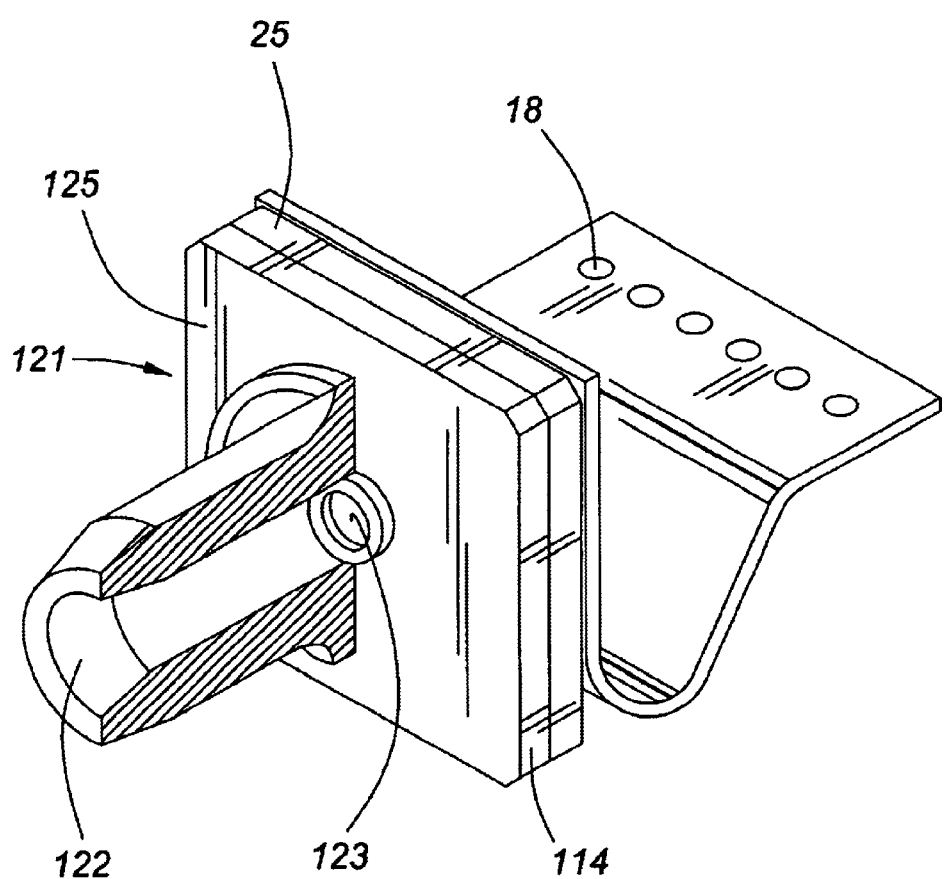
FIG. 11 is an isometric view of another embodiment of the present invention.
Figure 12:
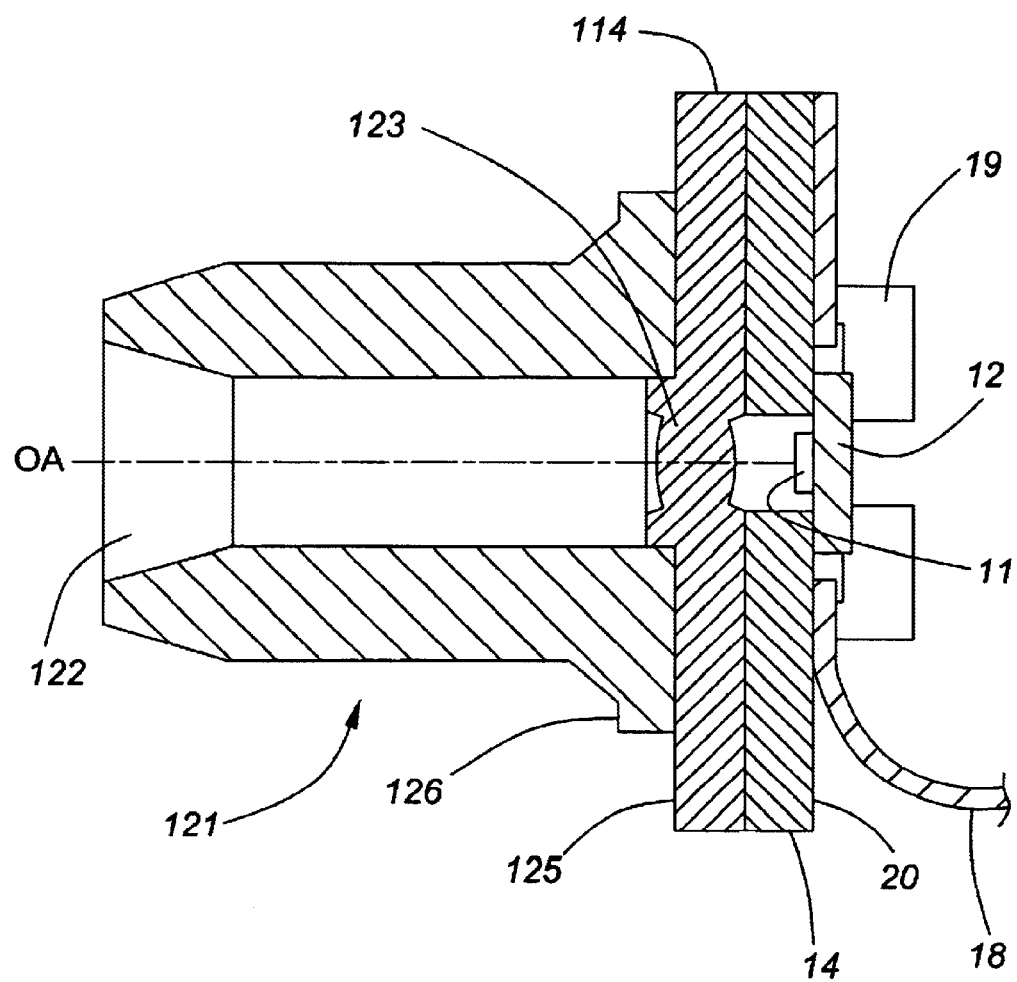
FIG. 12 is a side view of the ROSA of FIG. 11.
Figure 13:
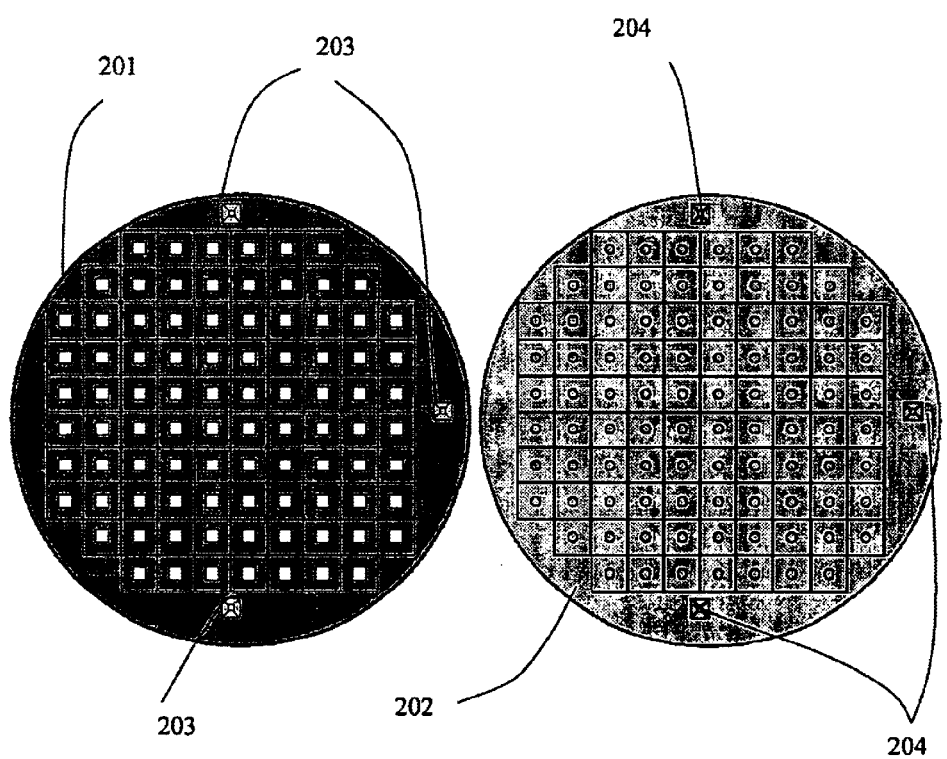
FIG. 13 is a plan view of wafers used in the manufacture of the ROSA of FIGS. 11 and 12.

Alternatively, with reference to FIGS. 11 and 12, an optical coupler 121 can simply include a ferrule receiving tube 122, which is mounted on a front face 125 of a second SiOB 114. A lens 123 is etched from the second SiOB 114. The second SiOB 114 can be integral with the SiOB 14 or comprised of a second piece of material with optical properties selected for the specific application, e.g. transparent to a desired wavelength, more effective at higher data rates. In this case, the bumps extend from the second SiOB 114 for mating with the wells formed in the SiOB 14. The SiOB 14 and the second SiOB 114 are secured together by any known means, e.g. adhesive, solder, wafer bonding or fusion. An attachment ring 126, which slides over the ferrule receiving tube 122, facilitates attachment of the ferrule receiving tube 122 to the second SiOB 114 using any of the aforementioned known securing means. Again, the photodiode 11, the pre-amplifier 12, the lens 123 and the optical coupler 121 are all disposed along the optical axis OA to minimize space and facilitate assembly.

Figure 14:
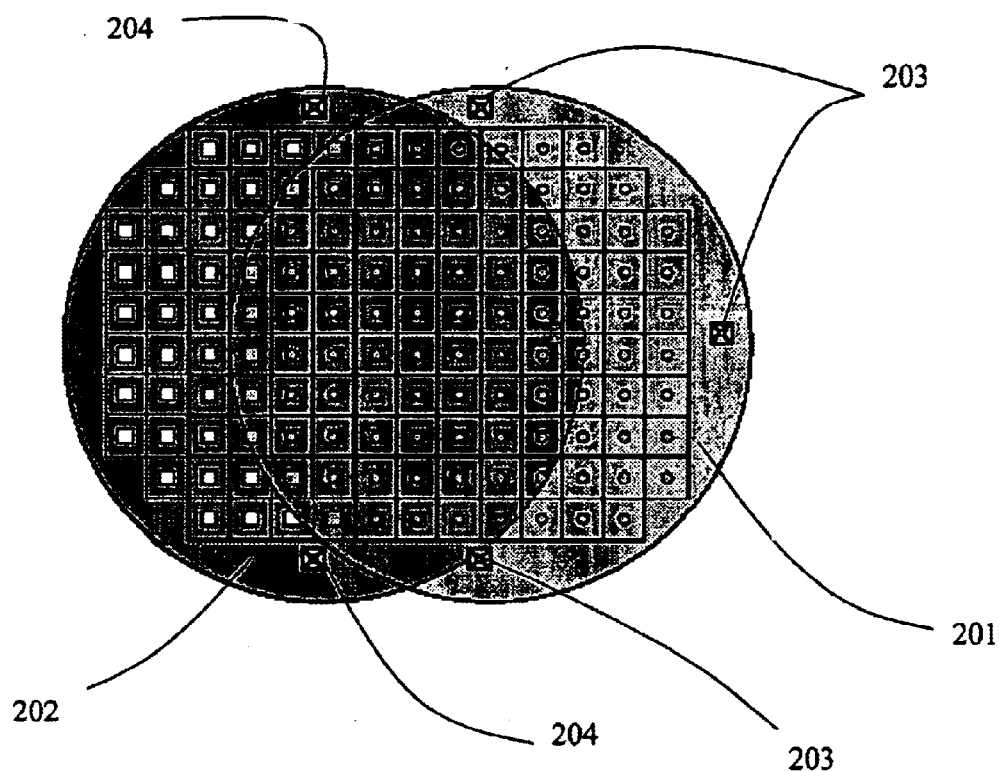
FIG. 14 is a plan view of the wafers of FIG. 13 during the assembly process.
Figure 15:
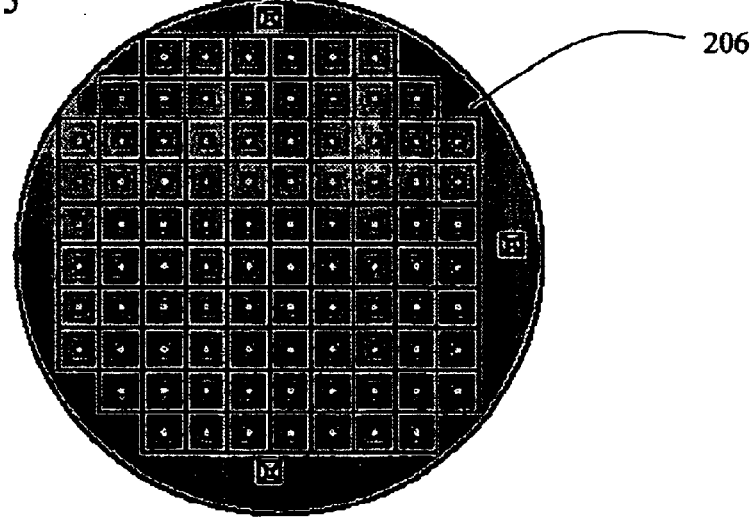
FIG. 15 is a plan view of a combined wafer structure.

The two-piece structure illustrated in FIGS. 11 and 12 can be assembled in a batch process, by etching a first wafer 201 with a plurality of the first SiOB's 14, and by etching a second wafer 202 with a plurality of the second SiOB's 114. Subsequently, the first and second wafers 201 and 202 are aligned (FIG. 14) with the help of references 203 and 204, e.g. etched wells and bumps, whereby the first and second SiOB's 14 and 114 are aligned flush with each other before fixation. The assembled structure 206 (FIG. 15) is then diced into individual units. The optical connectors 122 are then attached to the front surface 125 of the second SiOB 114, and the electrical connectors 18 are attached the rear surface 20 of the first SiOB 14.

Figure 16:
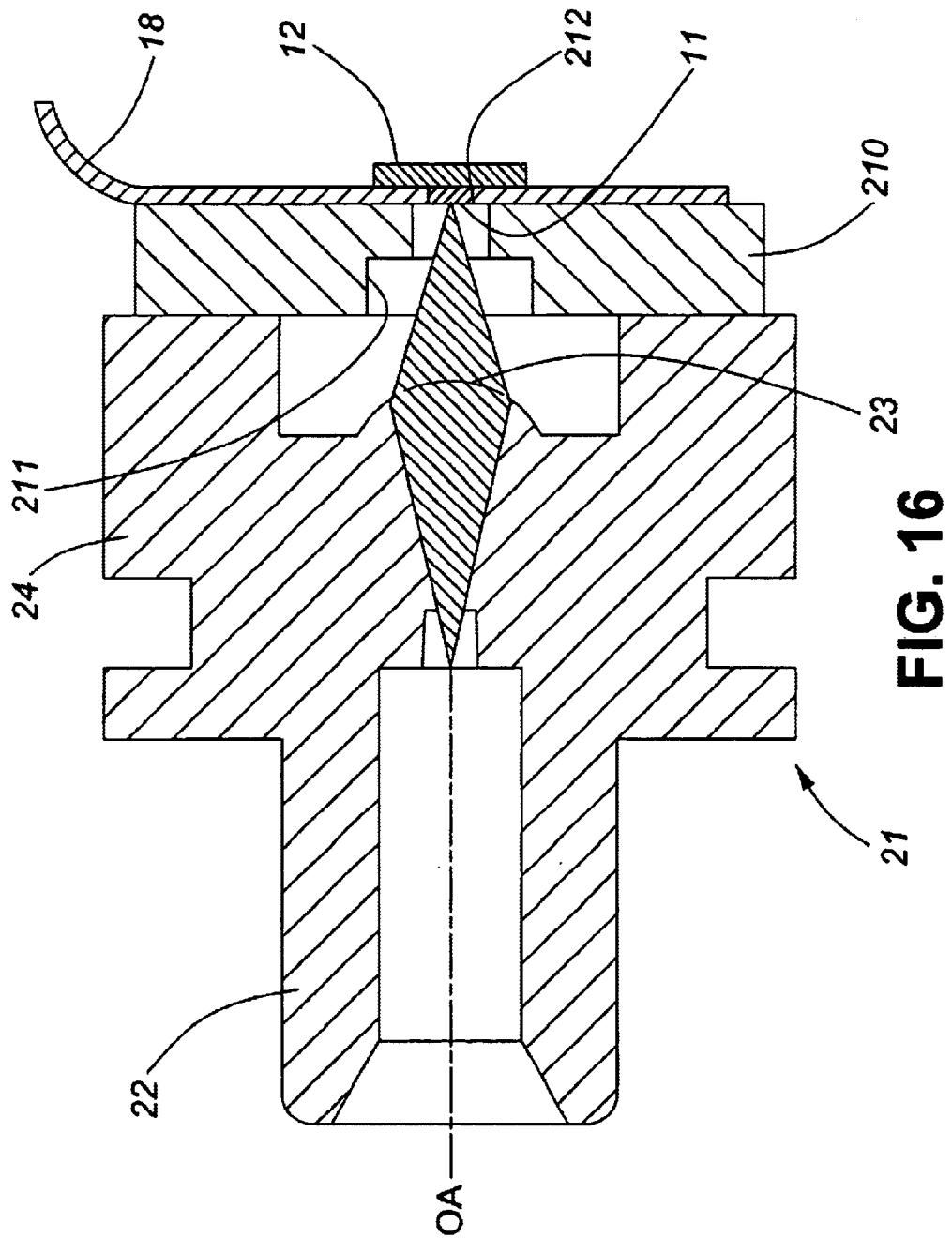
FIG. 16 is a side view of another embodiment of the present invention.

In an alternative embodiment illustrated in FIG. 16, the pre-amplifier 12, with the photodiode 11 mounted thereon, is assembled directly onto the flexible circuit connector 18, which are all supported by a flex stiffener 210. The flex stiffener 210, fabricated from a lower cost material than the SiOB 14, is used as a substrate to secure one end of the flexible circuit connector 18 to the optical coupler 21. The flex stiffener 210 need not be transparent to light, and therefore includes a cavity 211 to enable the light to pass from the lens 23 to the photodiode 11. Again, an entire surface of the flex stiffener 210 is covered by the entire end section of the flexible circuit connector 18, except for a hole 212 therein for receiving the photodiode 11 therethrough. The pre-amplifier 12 is electrically connected to the flexible circuit connector 18 at points around the hole 212.

A similar arrangement can be used to assemble a Transmitter Optical Sub-Assembly (TOSA), wherein the photodiode 11 is replace by another type of transducer, such as a front or rear emitting vertical cavity surface emitting laser (VCSEL), and the pre-amplifier is replaced by another form of transducer controlling chip, such as a laser driver. The VCSEL is mounted on the laser driver chip, which is mounted on the SiOB 14 substrate or the flexible circuit connector 18. The flexible circuit connector 18 electrically connects the transducer controlling chip to the host opto-electronic device. The optical coupler 21 is attached to the SiOB 14 using one of the aforementioned ways.

Figure 17:
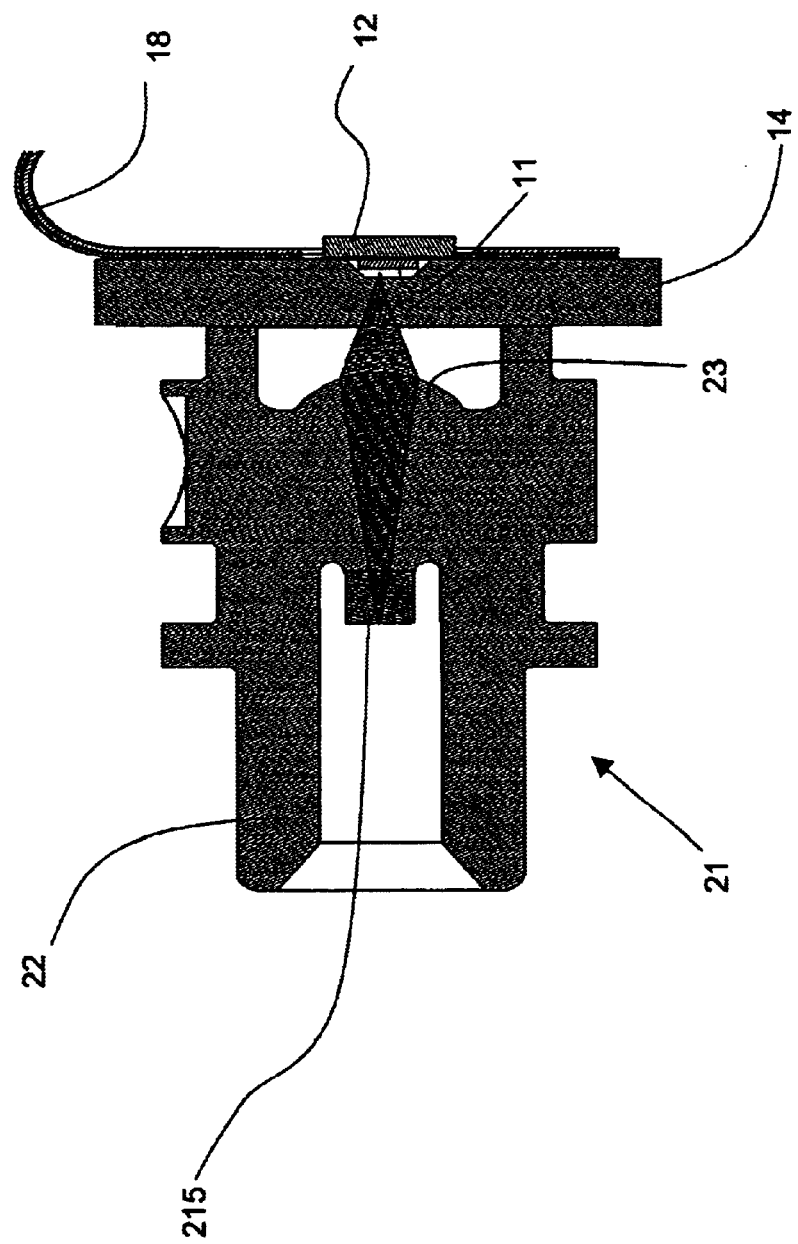
FIG. 17 is a side view of another embodiment of the present invention.

An index matching optical insert 215 (FIG. 17) is mounted inside the ferrule receiving tube 22 adjacent the plastic lens 23 using an index matching adhesive. The adhesive would have an index or refraction midway between the index of refraction of the lens 23 and the insert 215. Alternatively, the insert 215 can be mounted without the use of an adhesive, such as by press fitting the insert into the receiving tube 22. The index of refraction of the insert 215 need not be exactly the same as the fiber, but should be close depending upon design specifications. The insert 215 can be made of inter alia silica, BK7, Borosilicate Float Glass. Since the fiber is silica based, the reflection of the fiber/insert 215 interface is negligible; however, the index difference at the insert 215/lens 23 interface does cause some small amount of back reflection. Since the light beam is expanding as it leaves the fiber, and continues to expand after reflection, the overlap between the back reflected beam and the fiber mode is small. Accordingly, only a small fraction of the beam is back reflected from the insert/lens interface, and reduced as the insert 215 is made longer.

We claim:

1. A receiver optical sub-assembly (ROSA) for mounting in a host opto-electronic device comprising:

an optical coupler for receiving an optical signal from an optical waveguide along an optical axis;

a photodiode disposed along the optical axis for receiving the optical signal and for converting the optical signal into an electrical current signal;

an amplifier for converting the electrical current signal into a differential voltage signal, having the photodiode mounted thereon;

a substrate, a first surface of which is connected to the optical coupler, and a second surface of which supports the amplifier, whereby the optical signal travels from the first surface through the substrate to the photodiode mounted on the amplifier;

an electrical connector connected to the second surface for electrically connecting the amplifier to the host opto-electronic device.

2. The ROSA according to claim 1, further comprising a lens positioned between the optical coupler and the photodiode.

3. The ROSA according to claim 2, wherein the second surface of the substrate includes a cavity; wherein the photodiode is mounted on the amplifier; and wherein the amplifier is mounted on the second surface of the substrate at positions around the cavity with the photodiode extending into the cavity.

4. The ROSA according to claim 3, wherein the cavity contains a material with an index of refraction similar to that of the lens.

5. The ROSA according to claim 3, wherein the photodiode is a rear-illuminated photodiode with electrical contacts on a front face thereof; wherein the front face of the photodiode is bonded to a mounting surface of the amplifier; and wherein the mounting surface of the amplifier includes electrical contacts in electrical contact with corresponding electrical contacts of the photodiode.

6. The ROSA according to claim 5, wherein the amplifier includes a redistribution layer mounted on the mounting surface for electrically connecting the photodiode contacts with the amplifier contacts.

7. The ROSA according to claim 2, further comprising an index matching insert inside the optical coupler disposed between the optical waveguide and the lens having an index of refraction substantially the same as that of the fiber.

8. The ROSA according to claim 2, wherein the lens is integral with the optical coupler; and wherein the substrate is transparent to the optical signal.

9. The ROSA according to claim 2, wherein the substrate comprises a first semiconductor micro-bench; and wherein the lens is formed in the first surface of the first semiconductor micro-bench.

10. The ROSA according to claim 2, wherein the substrate comprises a first semiconductor micro-bench and a second semiconductor micro-bench fixed thereto; and wherein the lens is formed in the second semiconductor micro-bench.

11. The ROSA according to claim 10, wherein the second semiconductor micro-bench includes a first set of reference elements; and wherein the first semiconductor micro-bench includes a second set of reference elements;

whereby the first semiconductor micro-bench and the second semiconductor micro-bench are aligned during assembly by mating the first set of reference elements with the second set of reference elements.

12. The ROSA according to claim 1, wherein the electrical connector is a flexible electrical circuit connector.

13. The ROSA according to claim 12, wherein the flexible electrical circuit connector substantially covers the second surface of the substrate, except for cut-out portions in the flexible electrical circuit, which receive electrical components extending from the second surface.

14. The ROSA according to claim 12, wherein the flexible electrical circuit connector substantially covers the second surface of the substrate; wherein the photodiode extends through a hole in the flexible electrical circuit for receiving light from the optical waveguide; and wherein the amplifier is electrically connected to the flexible electrical circuit at points around the hole therein.

15. The ROSA according to claim 1, wherein the first surface of the substrate includes a third set of reference elements; and wherein the optical coupler includes a fourth set of reference elements for mating with the third set of reference elements;

whereby the substrate and the first optical coupler are aligned during assembly by mating the third set of reference elements with the fourth set of reference elements.

16. An optical transceiver mounting in a host device comprising:

an optical connector for receiving a duplex optical connector, which includes a first fiber for transmitting an optical signal to the transceiver and a second fiber for transmitting an optical signal from the transceiver;

a transmitter optical sub-assembly (TOSA) for generating an optical signal from an electrical signal when optically coupled to the second fiber;

a receiver optical sub-assembly (ROSA) for generating an electrical signal from an optical signal when optically coupled to the first fiber;

a housing for supporting the TOSA and the ROSA;

an electronic circuit board mounted in the housing electrically connected to the TOSA and the ROSA; and an first electrical connector for electrically connecting the electronic circuit board to the host device;

wherein the ROSA comprises:

an optical coupler for receiving the optical signal from the first fiber along an optical axis;

a photodiode disposed along the optical axis for receiving the optical signal and for converting the optical signal into an electrical current signal;

an amplifier for converting the electrical current signal into a differential voltage signal, having the photodiode mounted thereon;

a substrate, a first surface of which is connected to the optical coupler, and a second surface of which supports the amplifier, whereby the optical signal travels from the first surface through the substrate to the photodiode mounted on the amplifier; and a second electrical connector connected to the second surface for electrically connecting the amplifier to the electronic circuit board.

17. The transceiver according to claim 16, further comprising a lens positioned between the optical coupler and the photodiode.

18. The transceiver according to claim 17, wherein the second surface of the substrate includes a cavity; wherein the photodiode is attached to the amplifier; and wherein the amplifier is connected to the second surface of the first semiconductor at positions around the cavity with the photodiode extending into the cavity.

19. The transceiver according to claim 18, wherein the photodiode is a rear-illuminated photodiode with electrical contacts on a front face thereof; wherein the front face of the photodiode is bonded to a mounting surface of the amplifier; and wherein the mounting surface of the amplifier includes electrical contacts in electrical contact with corresponding electrical contacts of the photodiode.

20. The ROSA according to claim 16, wherein the first surface of the substrate includes a third set of reference elements; and wherein the optical coupler includes a fourth set of reference elements for mating with the third set of reference elements;

whereby the substrate and the first optical coupler are aligned during assembly by mating the third set of reference elements with the fourth set of reference elements.

21. An optical sub-assembly for mounting in a host opto-electronic device and for optically coupling with an optical waveguide comprising:

an optical coupler for transmitting an optical signal between the optical waveguide and the optical sub-assembly along an optical axis;

a transducer disposed along the optical axis for converting optical signals from the waveguide into electrical current signals or for converting electrical signals from the host opto-electronic device to optical signals;

a transducer control chip for converting the electrical current signal from the transducer into a differential voltage signal or for driving the transducer to produce optical signals, wherein the transducer is mounted on the transducer control chip;

a substrate, a first surface of which is connected to the optical coupler, and a second surface of which supports the transducer control chip, whereby the optical signals travel through the substrate between the optical coupler and the transducer;

an electrical connector connected to the second surface for electrically connecting the transducer control chip to the host opto-electronic device.

* * * * *